Aug. 12, 1924.
F. TUCKER
ROTARY ENGINE
Filed March 31, 1921
1,504,918
4 Sheets-Sheet 1
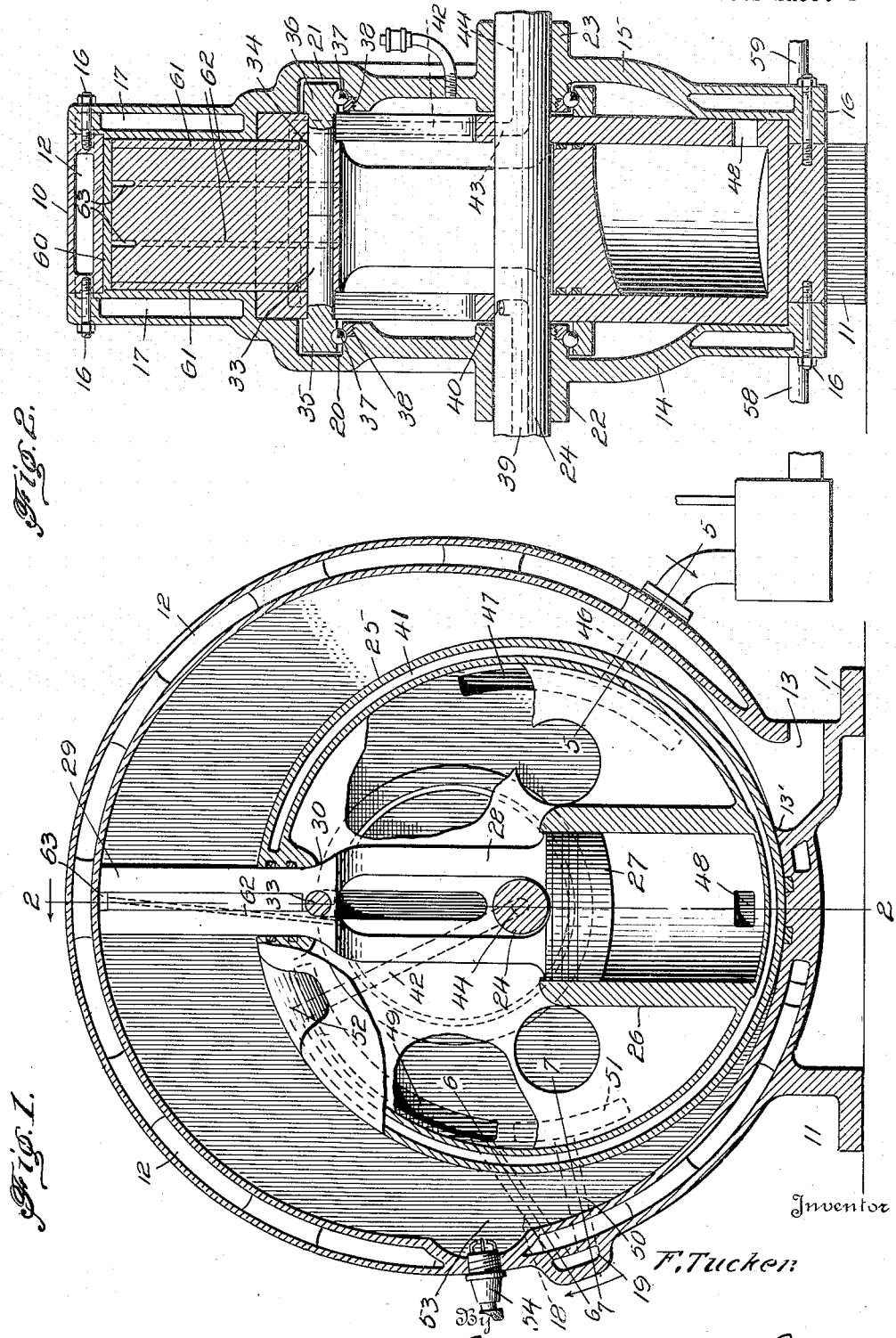
Inventor
F. Tucker
Geo. T. Kimmel
Attorney

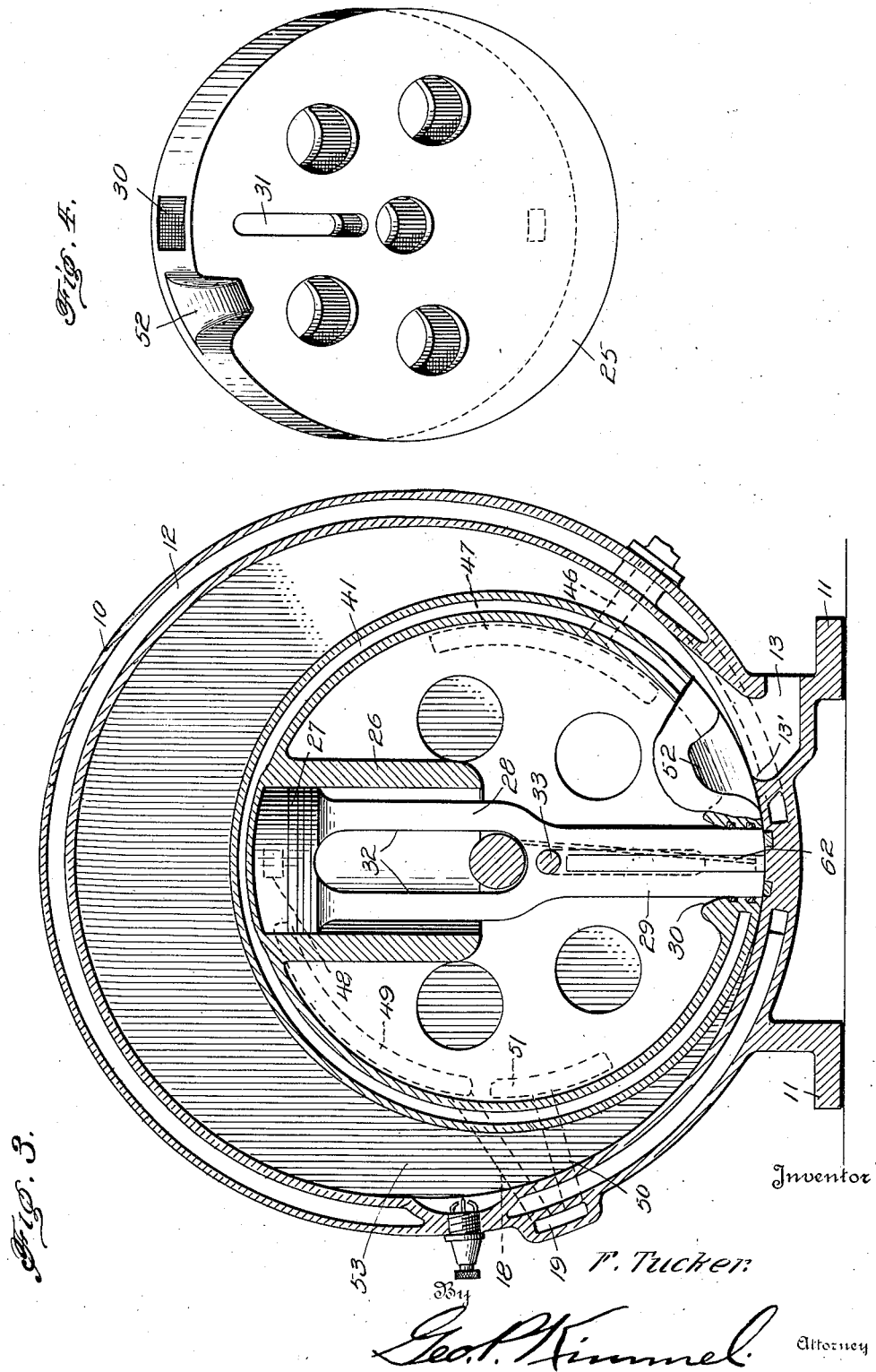

Aug. 12, 1924.  1,504,918

F. TUCKER

ROTARY ENGINE

Filed March 31, 1921  4 Sheets-Sheet 3

Inventor
F. Tucker.
By
Geo. P. Kimmel
Attorney

Aug. 12, 1924.

F. TUCKER 1,504,918

ROTARY ENGINE

Filed March 31, 1921   4 Sheets-Sheet 4

Fig. 9.

Inventor

F. Tucker,

By Geo. P. Kimmel, Attorney

Patented Aug. 12, 1924.

1,504,918

UNITED STATES PATENT OFFICE.

FREDERICK TUCKER, OF SANTA BARBARA, CALIFORNIA.

ROTARY ENGINE.

Application filed March 31, 1921. Serial No. 457,164.

*To all whom it may concern:*

Be it known that I, FREDERICK TUCKER, a citizen of the United States, residing at 300 West Mission Street, Santa Barbara, in the county of Santa Barbara and State of California, have invented certain new and useful Improvements in a Rotary Engine, of which the following is a specification.

The invention relates to improvements in rotary engines, and more particularly to an internal combustion or explosive type of the same, although, with but slight modifications, the same may be operated as a steam engine, a rotary pump, or a rotary air compressor.

The principal object of the invention is to provide for an extremely simplified form of rotary engine, and one wherein a maximum compression of the fuel, gas, or air, or mixtures of the same, obtains in a cycle of operation, and the maximum force of the prime mover is effectively utilized by reason of losses in compression being reduced to a minimum.

Another object of the invention is to provide a motor of the type mentioned, and one wherein all forms of valves are eliminated, the inherent construction of the parts being arranged to function in a manner for such purpose.

A further object of the invention is to provide a motor of the character set forth with a means for effectively cooling all parts of the same as may be subjected to the heat resulting from combustion, compression, or expansion of the fuel or gas utilized in or passing through the parts thereof.

A still further object of the invention is to provide an engine of the class mentioned with a suitable and effective lubricating means, so applied to the moving parts thereof as to prevent the leakage of the lubricant into that portion of the same where it is not needed and which would otherwise reduce the efficiency in operation of the engine.

With the foregoing and other objects in view, the invention resides in the certain new and useful construction and arrangement of parts as will be hereinafter more fully described, set forth in the appended claims, and illustrated in the accompanying drawings, in which:—

Figure 5:
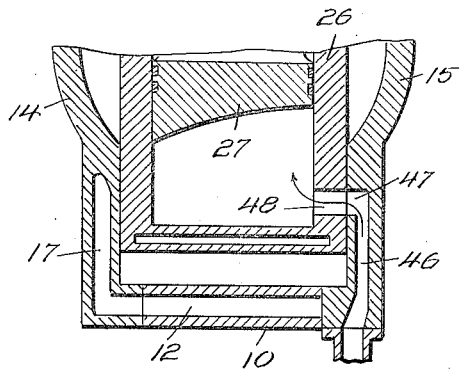
Figure 6:
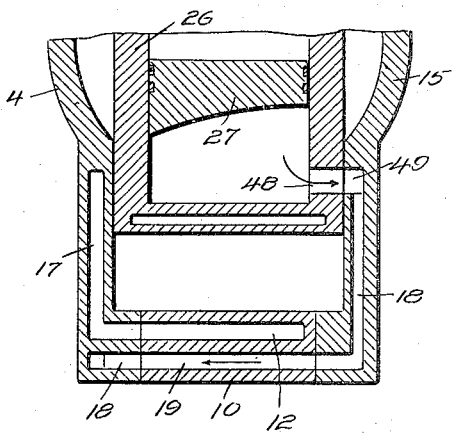
Figure 7:
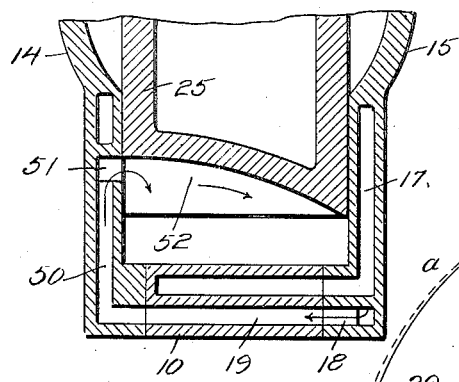
Figure 8:
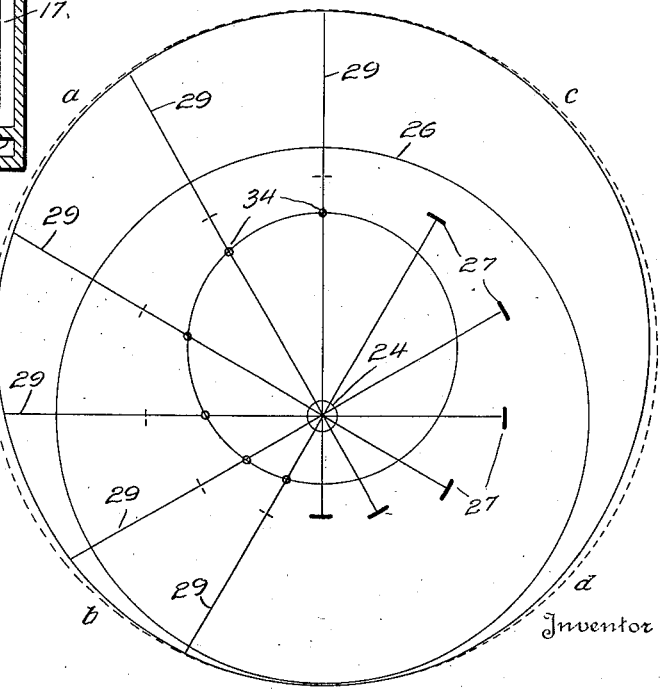

Fig. 1 is a vertical section showing the piston at the limit of its suction stroke, Fig. 2 is a vertical transverse section taken on the line 2—2 of Fig. 1, Fig. 3 is a view similar to that of Fig. 1 but showing the position of the piston at the end of its power stroke, Fig. 4 is a detail in perspective of the compressor rotor or drum, Fig. 5 is a fragmentary sectional detail showing the intake ports in registry one with the other and the piston on its suction stroke, Fig. 6 is a view similar to that Fig. 5 but showing the piston on its compression stroke with the outlet ports for the compressed fuel, or gas, registering, Fig. 7 is a fragmentary sectional detail showing the depression on the periphery of the rotor or drum in registry with the fuel charge or gas port opening into the explosive chamber, Fig. 8 is a diagrammatical view showing the relative position of the parts within a casing during the cycle of operation of the engine, and, Fig. 9 is a vertical section of the modified form of the invention.

Referring to the drawings, wherein similar characters of reference designate corresponding parts in the several views thereof, and more particularly to Figs. 1 to 8, inclusive, the numeral 10 indicates an engine casing preferably of circular or cylindrical form, and having base supporting portions 11 formed on the peripheral wall thereof. The casing 10 is formed with double walls to provide water-cooling spaces 12, and has an exhaust port 13 opening outward of the peripheral wall immediately adjacent or through one of the base supporting portions 11. The opposite open side of the casing 10 is closed by circular end plates or walls 14 and 15 which are secured in position by means of suitable fastenings such as the lag screws 16. The end plates 14 and 15 are formed with water-cooling spaces 17 in the walls thereof, and certain fuel conducting channels 18, 46 and 50. The casing wall 10 is provided with a transverse duct 19 and leading from one end thereof is the conducting channel 18, and extended from the other end thereof is the conducting channel 50. The end plates 14 and 15 are further formed to provide on their opposed faces with annular bearing channels 20 and 21, respectively, concentrically disposed with respect to the casing 10, and bearing journals 22 and 23, respectively, eccentrically disposed with respect to both the casing 10 and the channels 20 and 21, and at a point just inward of the periphery of the latter and on the vertical center thereof.

Rotatable in the journals 22 and 23 is a shaft 24 from which power is to be taken from the engine, or applied to the same when it is used as a compressor or the like. Mounted on the shaft 24 and concentrically therewith, is a cylindrical drum or rotor 25 which is formed to provide a cylinder 26 extending radially inward of the periphery thereof, open at its inner end and immediately to one side of the shaft 24, which extends diametrically across the open end thereof. Movable within the cylinder 26 is a piston formed to provide a head portion, or piston proper, 27, an intermediate yoke portion 28 engaged over the shaft 24 and a free end portion 29 which extends outwardly of an opening, as at 30, formed in the peripheral wall of the drum or rotor 25, the end portion 29 forming an abutment having its end face contacting the inner periphery of the casing 10 throughout its movement thereon in the rotation of the shaft 24 and the drum 25. Formed in the opposite walls of the drum 25 are radially disposed slots 31 which are aligned with the slots 32 of the yoke 28 and engaged through the slots 31 and 32 are bearing pins 33 and 34, formed respectively with bearing rings 35 and 36 which are rotatably supported in the guide channels or raceways 20, and 21, which channels or raceways 20 and 21 are provided with a circular series of ball bearings 37 held in proper position respectively by the rings or collars 38.

For the purpose of cooling the journals 22 and 23 and the peripheral wall of the drum or rotor 25, the shaft 24 is formed with a duct 39 extending inwardly from one end thereof, a radially opening port 40 in registry with the radially extending duct formed in the adjacent side wall of the drum 25 and which connects to an annular water space 41 formed in the latter, the other side wall of the drum or rotor 25 having a radially extending duct 42 in communication with the port 43 of the longitudinally extending outlet duct 44 passing outward toward the opposite end of the shaft 24.

Fuel is admitted to the engine from a suitable source of supply 45 through the duct 46 formed in the end plate 15 and which connects the delivery port 47 which opens inward of the wall or plate 15 and is disposed on a curved line so as to be registered with a combined inlet and outlet port 48 formed at one side and adjacent to periphery of the drum 25, for a suitable period of the rotation of the latter. The port 48 opens into the cylinder 26 adjacent the closed outer end thereof, and fuel is drawn therethrough during the movement of the piston head 27 inward towards the open end of the same, which movement constitutes the suction stroke of the piston. As the drum 25 is rotated in clock-wise fashion and moves the port 48 out of registry with the port 47, the piston head 27 moves the full length of its suction stroke, and, on further movement of the drum or rotor 25, starts on its opposite or compression stroke, and the fuel charge is compressed until the port 48 is brought into registry with the entrance port 49 of the channel 18 which is diametrically opposite to the port 47 and is similarly formed on a curved line in the wall of the plate 15 and inward of the periphery of the drum 25. The compressed fuel charge or gas is forced out of the port 48 through the port 49 on the completion of the compression stroke of the piston, and is led by the duct 18 to a pocket or transverse duct 19 formed in the peripheral wall of the casing 10, and by means of channel 50 formed in the end plate 14 through a discharge port 51 of the channel 50. When the depression 52 formed in the periphery of the drum or rotor 25 registers with the port 51, the fuel charge or gas is discharged into the explosive chamber 53 formed in the casing, when the abutment of the piston passes to a position beyond the spark plug 54.

In the operation of this form of engine, the same is to be started after the usual manner, as by imparting a rotary movement to the shaft 24, so that the port 48 is brought into registry with the delivery port 47, when a charge of fuel is drawn into the cylinder 26 by reason of the piston 27 being on its suction stroke. Continued rotary movement moves the port 48 out of registry with the delivery port 47, and the piston to its full suction stroke, the piston being disposed at this point in a position vertically of the casing, and then as the latter moves up to the vertical, it also starts on its downward or compression stroke, which continues until the port 48 registers with the entrance port 49, when the fuel will be forced therethrough by the further outward movement of the piston in the cylinder. The fuel passes through channel 18, duct 19, and channel 50 and is discharged from the port 51 when the depression 52, of the rotor or drum 25, registers therewith. The fuel is discharged into the explosive chamber 53 in proximity to the spark plug 54, which immediately fires the charge, after port 51 has moved out of registry with depression 52, and the force of the explosion thereof is exerted against the abutment 29 of the piston, and expands during the further travel of the latter until the same passes the exhaust port 13 from which the burnt gases are discharged. Further movement of the abutment, and consequently of the rotation of the drum 25, again brings the port 48 into direct registry with the port 47, and another fuel charge is drawn into the cylinder 26 for a repeat operation.

In Fig. 9, there is shown a modified form of the invention, and the same embodies a substantial duplication of the parts as in the first instance, for the purpose of producing a more powerful engine, and in its general make-up, the parts are the same, and are similarly designated. In this form of the invention, two casings 10' and 10'' are arranged side by side in spaced relation, and the outer opposite ends are enclosed by the end plates 14' and 15', while the opposed open sides are closed by an intermediate plate 55. This intermediate plate 55 is formed throughout a greater portion of its circumference to provide spaced double walls 56 one complemental to each casing opening and secured to the edges thereof by means of lag screws 16', and between these double walls are water spaces 12'. The plate 55 is formed to provide a central opening of substantially less diameter with respect to the drums or rotors 25' and 25'', so as to have communication between the casings 10' and 10'' prevented by the opposed walls of the latter. A single shaft 24' passes through the two casings 10' and 10'' and is supported at its opposite ends in journals 22' and 23' of the plates 14' and 15', respectively, and has its intermediate portion passed through the slots 32' and 32'' of the yokes 28' and 28'', as in the first instance. In this construction, however, the pin 33' is formed with or secured to the abutment 29' and is detachably engaged in bearing ring or collar 35', while the pin 34' is similarly arranged for engagement with the bearing ring 36'.

It is to be here noted that the piston and cylinder within the casing 10' is in a reverse position with respect to the piston and cylinder of the casing 10'', so that when, as shown, the inlet and outlet port 48' of the drum or rotor 25' is in registry with the fuel delivery 47', the inlet and outlet port 48'' of the drum or rotor 25'' is at the point diametrically opposite to the same, so that the fuel is being drawn into the port 48' while the compressed fuel charge has just been discharged from the port 48'' and fired in the explosion chamber 53 of the casing 10''. The fuel delivery ports 47' are formed in the intermediate plate 55 and are common to the port 48' and 48'' and are connected to a suitable fuel supply as at 57.

It is to be here noted, by reference to Fig. 8 that the inner peripheral wall of the casings 10, 10' and 10'' is not defined by a true circle, but is flattened sufficiently at opposite sides as at *a—b* and *c—d*, so that the opposed ends of the abutments are maintained within the surfaces thereof always in substantial contact with the opposed face of the wall, whereby to prevent leakage of the fuel, under compression or in exploded and expanded condition, beyond the same during each cycle or movement thereof.

For cooling the casings 10' and 10'' and the end plates 14' and 15', the water spaces 12 and 17 thereof being in communication one with the other, when the parts are assembled, water is admitted thereto through similar inlet pipes 58 and drawn therefrom through the outlet pipes 59, as in Fig. 2, while the journals 22' and 23', together with the drums 25' and 25'' are cooled after the manner indicated for the first form of the invention.

All parts of the engine constructed in accordance with the invention are to be provided with a packing so as to prevent leakage of the fuel from one part to another, and to prevent leakage of the lubricant of the moving parts thereof from getting into the explosion chamber. The abutments 29, 29' and 29'' are to be provided with a packing 60 extending across their end faces and this packing is preferably of a form to extend along the opposite sides thereof, as at 61, whereby the entire exposed wall surface of the explosion and expansion chambers within the casing is contacted thereby, so as to prevent the leakage of fuel under compression or expansion around the same, and whereby the entire force exerted by the exploded or expanded fuel is directly against the abutment.

The invention also contemplates a suitable lubricating means (not shown) whereby all moving parts of the engine are affected, and this means may be in the form of the force feed system whereby the interior of the drums 25, 25' and 25'' are kept filled or partially filled with the oil. It is also desirable that the packing 60 at the end of the abutments 29, 29', and 29'' be lubricated, and for this purpose ducts 62 are provided in each and the same extend longitudinally of the same and communicate with the interior of the drums, and these ducts are connected at their outer ends with ducts 63 extending across the faces of the abutments beneath the packing 60. In the rotation of the drums, when the abutments are in their lowest position, the ducts 62 will take in sufficient oil to fill or partially fill the ducts 63, whereby the packing 60 will be effectively lubricated at all times during the continued operation of the engine.

For the purpose of keeping the periphery of the drum or rotor 25 clear of surplus oil and free from carbon deposits from the combustion of the fuel, the edge of the wall of the casing 10, at one side of the exhaust opening 13, is formed to provide a substantially knife-edged extension 13' which acts to scrape the surface of the peripheral wall thereof continuously during the operation of the engine.

It is well understood that various changes in detail construction and arrangement of parts may be resorted to without departing from the spirit and scope of the invention.

Having thus fully described the invention, what is claimed is:—

1. A rotary engine comprising a stationary casing forming a combined explosion and rotor chamber, a shaft disposed eccentrically of said casing, a rotor concentrically mounted on said shaft and having a part thereof in continuous contact with the wall of said chamber, said rotor having at one side thereof a cylinder formed with a combined inlet and discharge port and a combined fuel suction, compressing and expelling piston operating in the cylinder diametrically of the rotor and provided with a pressure operated element shiftable through the opposite side of the rotor and riding permanently against the wall of said chamber to provide an explosion space therein, said casing having a transverse duct and a fuel conducting channel leading from each end of said duct, one of said channels terminating in an entrance port registering with the port of said cylinder for receiving fuel therefrom during the operation of the rotor, the other of said channels terminating in a discharge port and receiving fuel from said duct, said chamber further provided with a fuel supply channel having a delivery port registering with the port of the cylinder in advance of the registration of said entrance port during the operation of the rotor, said rotor provided with a clearance for opening said discharge port to said chamber subsequent to the registration of said entrance port, an igniting element extending into said chamber and said casing provided with an exhaust for said chamber, the ports of said channels controlled by said rotor.

2. A rotary engine comprising a stationary casing forming a combined explosion and rotor chamber, a shaft disposed eccentrically of said casing, a rotor concentrically mounted on said shaft and having a part thereof in continuous contact with the wall of said chamber, said rotor having at one side thereof a cylinder formed with a combined inlet and discharge port and a combined fuel suction, compressing and expelling piston operating in the cylinder diametrically of the rotor and provided with a pressure operated element shiftable through the opposite side of the rotor and riding permanently against the wall of said chamber to provide an explosion space therein, said casing having a transverse duct and a fuel conducting channel leading from each end of said duct, one of said channels terminating in an entrance port registering with the port of said cylinder for receiving fuel therefrom during the operation of the rotor, the other of said channels terminating in a discharge port and receiving fuel from said duct, said chamber further provided with a fuel supply channel having a delivery port registering with the port of the cylinder in advance of the registration of said entrance port during the operation of the rotor, said rotor provided with a clearance for opening said discharge portion to said chamber subsequent to the registration of said entrance port, an igniting element extending into said chamber and said casing provided with an exhaust for said chamber, the ports of said channels controlled by said rotor, that channel provided with the entrance port arranged at one of the casing and that channel provided with the discharge port arranged at the other end of the casing.

3. A rotary engine comprising a stationary casing forming a combined explosion and rotor chamber, a shaft disposed eccentrically of said casing, a rotor concentrically mounted on said shaft and having a part thereof in continuous contact with the wall of said chamber, said rotor having at one side thereof a cylinder formed with a combined inlet and discharge port and a combined fuel suction, compressing and expelling piston operating in the cylinder diametrically of the rotor and provided with a pressure operated element shiftable through the opposite side of the rotor and riding permanently against the wall of said chamber to provide an explosion space therein, said casing having a transverse duct and a fuel conducting channel leading from each end of said duct, one of said channels terminating in an entrance port registering with the port of said cylinder for receiving fuel therefrom during the operation of the rotor, the other of said channels terminating in a discharge port and receiving fuel from said duct, said chamber further provided with a fuel supply channel having a delivery port registering with the port of the cylinder in advance of the registration of said entrance port during the operation of the rotor, said rotor provided with a clearance for opening said discharge portion to said chamber subsequent to the registration of said entrance port, an igniting element extending into said chamber and said casing provided with an exhaust for said chamber, the ports of said channels controlled by said rotor, said shaft and said rotor provided with associated means to provide for the circulation of a cooling medium through the body of the rotor.

4. A rotary engine comprising a stationary casing forming a combined explosion and rotor chamber, a shaft disposed eccentrically of said casing, a rotor concentrically mounted on said shaft and having a part thereof in continuous contact with the wall of said chamber, said rotor having at one side thereof a cylinder formed with a combined inlet and discharge port and a combined fuel suction, compressing and expelling piston operating in the cylinder diametrically of the rotor and provided with a pressure operated element shiftable through the opposite side of the rotor and riding permanently against the wall of said chamber to provide an explosion space therein, said casing having a transverse duct and a fuel conducting channel leading from each end of said duct, one of said channels terminating in an entrance port registering with the port of said cylinder for receiving fuel therefrom during the operation of the rotor, the other of said channels terminating in a discharge port and receiving fuel from said duct, said chamber further provided with a fuel supply channel having a delivery port registering with the port of the cylinder in advance of the registration of said entrance port during the operation of the rotor, said rotor provided with a clearance for opening said discharge port to said chamber subsequent to the registration of said entrance port, an igniting element extending into said chamber and said casing provided with an exhaust for said chamber, the ports of said channels controlled by said rotor, said rotor having a pair of aligned oppositely extending bearing pins near the perimeter and extended through said element, and each provided with a bearing ring rotatably supported in the ends of said casing.

5. A rotary engine comprising a stationary casing forming a combined explosion and rotor chamber, a shaft disposed eccentrically of said casing, a rotor concentrically mounted on said shaft and having a part thereof in continuous contact with the wall of said chamber, said rotor having at one side thereof a cylinder formed with a combined inlet and discharge port and a combined fuel suction, compressing and expelling piston operating in the cylinder diametrically of the rotor and provided with a pressure operated element shiftable through the opposite side of the rotor and riding permanently against the wall of said chamber to provide an explosion space therein, said casing having a transverse duct and a fuel conducting channel leading from each end of said duct, one of said channels terminating in an entrance port registering with the port of said cylinder for receiving fuel therefrom during the operation of the rotor, the other of said channels terminating in a discharge port and receiving fuel from said duct, said chamber further provided with a fuel supply channel having a delivery port registering with the port of the cylinder in advance of the registration of said entrance port during the operation of the rotor, said rotor provided with a clearance for opening said discharge port to said chamber subsequent to the registration of said entrance port, an igniting element extending into said chamber and said casing provided with an exhaust for said chamber, the ports of said channels controlled by said rotor, the ports of said channels being arcuate, the said entrance port being of greater length than said delivery port, and said discharge port of less length than said delivery and said entrance ports, and said combined inlet and discharge port being of less length than said delivery and entrance ports.

6. A rotary engine comprising a casing forming a combined explosion and rotor chamber, a shaft disposed eccentrically of said casing, a rotor concentrically mounted on said shaft within said chamber and having a part thereof in continuous contact with the wall of said chamber, said rotor including a diametrically shiftable combined fuel suction, fuel compressing, fuel expelling and pressure impacting element and further including a combined fuel inlet and discharge port, said element riding permanently against the wall of said chamber to provide an explosion space therein, said casing formed with a duct terminating at each end in a fuel conducting channel, one of said channels terminating in an entrance port registering with the port of said rotor for receiving fuel therefrom during the operation of the rotor, the other of said channels terminating in a discharge port opening into said chamber and receiving fuel from said duct, said casing further formed with a fuel supply channel having a delivery port registering with the port of the rotor and in advance of the registration of said entrance port during the operation of the rotor, said rotor provided with a clearance for opening said discharge port to said chamber subsequent to the registration of said entrance port, and an igniting element extending into said chamber, and said casing provided with an exhaust for said chamber.

7. A rotary engine comprising a casing forming a combined explosion and rotor chamber, a shaft disposed eccentrically of said casing, a rotor concentrically mounted on said shaft within said chamber and having a part thereof in continuous contact with the wall of said chamber, said rotor including a diametrically shiftable combined fuel suction, fuel compressing, fuel expelling and pressure impacting element and further including a combined fuel inlet and discharge port, said element riding permanently against the wall of said chamber to provide an explosion space therein, said casing formed with a duct terminating at each end in a fuel conducting channel, one of said channels terminating in an entrance port registering with the port of said rotor for receiving fuel therefrom during the operation of the rotor, the other of said channels terminating in a discharge port opening into said chamber and receiving fuel from said duct, said casing further formed with a fuel supply channel having a delivery port registering with the port of the rotor and in advance of the registration of said entrance port during the operation of the rotor, said rotor provided with a clearance for opening said discharge port to said chamber subsequent to the registration of said entrance port, and an igniting element extending into said chamber, and said casing provided with an exhaust for said chamber, the said channels provided with the entrance and delivery ports arranged at one end of said casing, and the said channels provided with the discharge port arranged at the other end of said casing.

In testimony whereof, I hereto affix my signature.

FREDERICK TUCKER.